United States Patent [19]

Toss

[11] 3,710,543
[45] Jan. 16, 1973

[54] ARRANGEMENT FOR DEPOSITING OBJECTS IN A RECEPTACLE

[75] Inventor: Franco Toss, 6301 Alten-Buseck, Germany

[73] Assignee: Hamac-Hansella GmbH, Viersen, Germany

[22] Filed: Dec. 30, 1970

[21] Appl. No.: 102,613

[30] Foreign Application Priority Data

Jan. 16, 1970 Germany..................P 20 01 760.1

[52] U.S. Cl........................................53/244, 53/248
[51] Int. Cl...........................B65b 5/10, B65b 39/12
[58] Field of Search.........214/6 P, 6 N; 53/244, 248, 53/251, 159

[56] References Cited

UNITED STATES PATENTS 3,613,330  10/1971  Voullaire..................................53/244
3,381,828  5/1968  Sheehan..................................214/6 P Primary Examiner—Robert C. Riordon
Assistant Examiner—Eugene F. Desmond
Attorney—Michael S. Striker

[57] ABSTRACT

An arrangement for depositing objects in a receptacle comprises a first conveyor which advances upwardly open cartons to a loading station and a second conveyor which conveys objects to be loaded seriatim to the loading station. A carriage is mounted for movement in one direction upwardly above and in at least substantial parallelism with the upper opening of the carton at the loading station, and another carriage is mounted on the first carriage for movement with reference thereto and to the opening of the carton in a direction normal to the first-mentioned direction. A distributing head is provided on the second carriage and receives objects from the second conveyor for depositing them in the receptacle through the opening in accordance with the positioning of the second carriage relative to the receptacle.

8 Claims, 3 Drawing Figures

PATENTED JAN 16 1973 3,710,543

INVENTOR.
FRANCO TOSS
BY

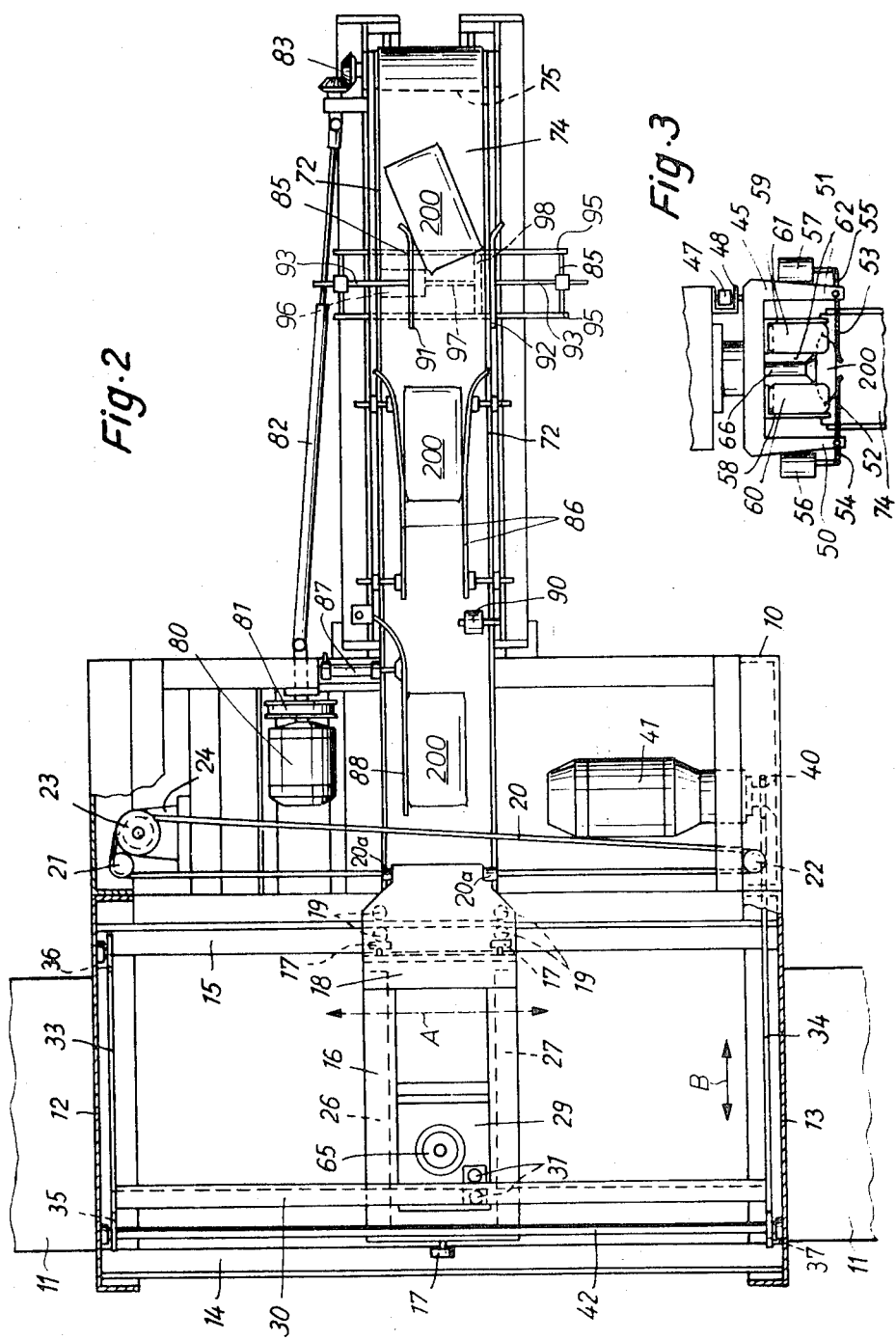

100
ARRANGEMENT FOR DEPOSITING OBJECTS IN A RECEPTACLE

BACKGROUND OF THE INVENTION

The present invention relates generally to a loading arrangement, and more particularly to an arrangement for depositing objects to a receptacle.

Objects such as bags or other items containing various goods, such as pulverulent, liquid or other matter, are rarely packed in cartons or similar receptacles by hand anymore. Such packaging is for the most part automatic. One arrangement for this purpose is known from German Pat. No. 1,254,524 which comprises a conveyor chain having article-engaging grippers which engage articles and deposit them from above into a tubular stacking device. In this stacking device a plurality of the articles can be stacked one upon the other and the device is turnable about its vertical axis so that two stacks can be formed therein of deposited articles, which are offset from one another through 180°. Once the stacks are formed in the stacking device, the latter is moved from its charging station to a loading station where a stamp or ram pushes the stacks of articles out of the device and into a receptacle provided for this purpose.

This prior-art construction is entirely suitable for depositing articles in a receptacle. However, it can do so only by depositing the articles in a precisely predetermined relationship in the receptacle, a relationship from which deviations in accordance with differing requirements of a particular circumstance, are not possible. Thus, the flexibility of use of the prior-art device mentioned above is strictly limited.

SUMMARY OF THE INVENTION

It is, accordingly, an object of the present invention to provide an arrangement for depositing objects in a receptacle which is not possessed of the limitations identified above with respect to the prior art.

More particularly it is an object of the present invention to provide such an arrangement of the type under discussion which makes it possible to deposit objects in a receptacle in a variety of different patterns and locations, all of which can be selected at will.

An additional object of the invention is to provide such an arrangement which is relatively uncomplicated and therefore simple and inexpensive to construct, and to maintain, with a concomitant high reliability factor.

Still another object of the invention is to provide such an arrangement which is capable in particular of so depositing objects such as packaged goods which are delivered by a packing machine—such as a bag-filling machine or the like—and irrespective of whether the objects are hard packages or soft packages such as bags and the like.

In pursuance of the above objects, and others which will become apparent hereafter, one feature of the invention resides in an arrangement for depositing objects in a receptacle which, according to one embodiment, briefly stated comprises first means for positioning at a loading station a receptacle having an upwardly directed opening. Second means is provided for conveying objects seriatim to said loading station. Finally, there is provided third means at the loading station for receiving the objects; this third means is movable in a plane above and at least substantially parallel with the opening in two mutually inclined directions and is operable for depositing the objects through the opening in the receptacle.

It will thus be seen that resort to the present invention makes it possible to choose at will the position within the receptacle at which objects are to be deposited.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a top-plan view of FIG. 1, partially in section; and

FIG. 3 is a fragmentary side view showing a detail of the embodiment in FIGS. 1 and 2 on an enlarged scale.

DESCRIPTION OF THE PREFERRED EMBODIMENTS

Figure 1:
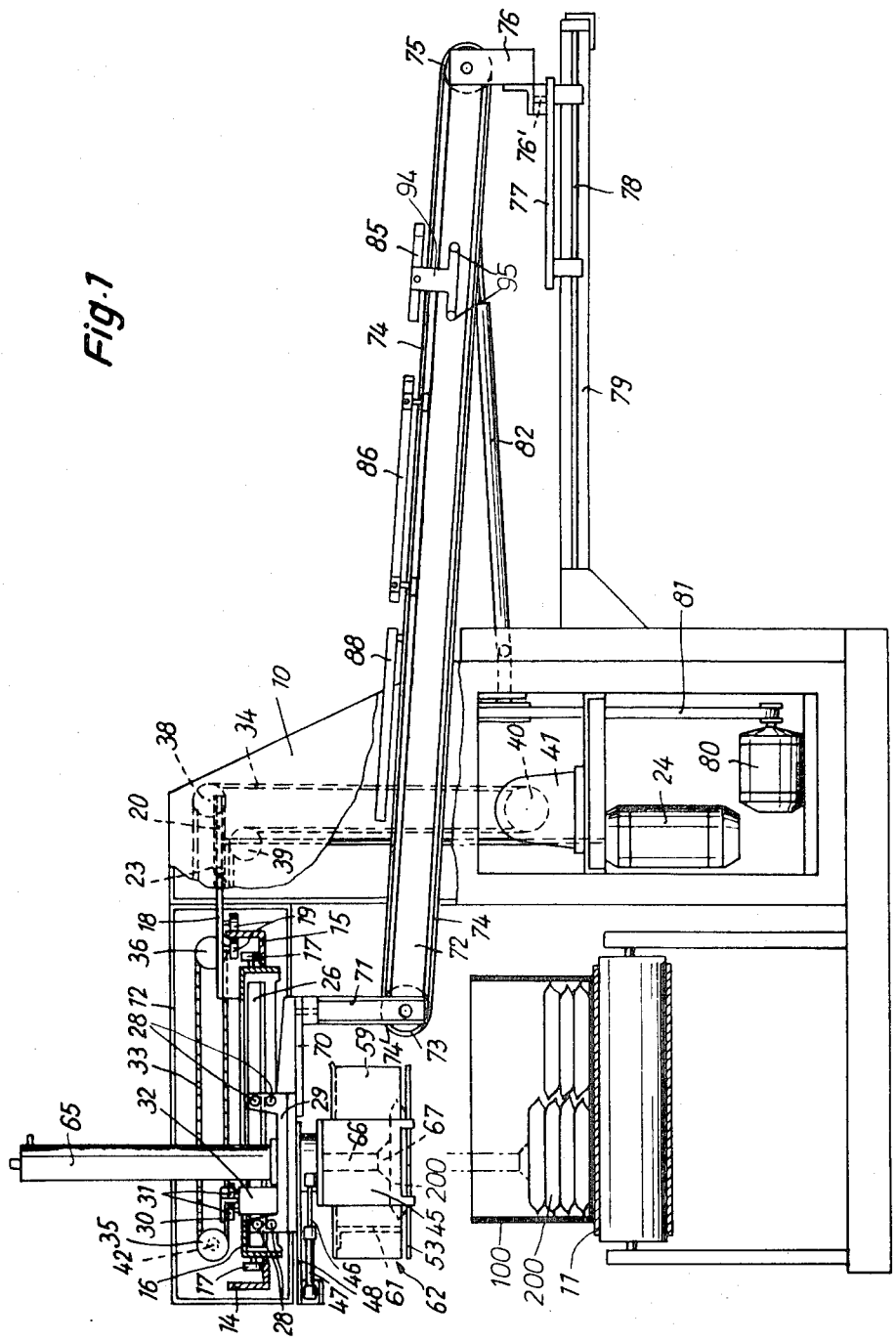
FIG. 1 is a side view, partially in vertical section, of an embodiment according to the present invention.

Discussing now the drawing in detail it will be seen that the exemplary arrangement according to the present invention has a frame 10 and a conveyor 11 on which upwardly open receptacles 100 are supplied into which objects or articles are to be deposited. The frame 10 has a pair of parallel traverse members 12 and 13 shown in FIG. 2, which extend above the conveyor 11 transversely to the elongation thereof as clearly shown in both FIGS. 1 and 2. They are connected with one another by two equally parallel beams 14 and 15 located in a horizontal plane and carrying a first carriage 16 of generally frame-shaped outline which can be moved on the beams 14 and 15 by means of three rollers 17. An arm 18 is provided on the carriage 16 projecting towards the frame 10 and two guide roller pairs 19 on the arm 18 roll along the upright portion of the angled beam 15 for longitudinal guidance of the carriage 16. The opposite ends 20a of a drive chain 20 engage at the outer end of the arm 18, and the remainder of the chain is trained about two rollers 21, 22 (compare FIG. 2) which are mounted in the frame 10, as well as about a drive roller 23 of a motor 24.

The carriage 16, in turn, supports a second carriage 29 which is displaceable in and with reference to the carriage 16. For this purpose the carriage 16 is provided with two angled beams 26 and 27 which also extend in parallelism with one another in a common horizontal plane but transversely to the elongation of the beams 14 and 15. Thus, the carriage 29 which can roll on pairs of rollers 28, can move in a direction which is inclined—more specifically, normal—to the direction in which the carriage 16 can move. An arm 32 projects upwardly from the carriage 29 and is provided with a pair of rollers 31 which are guided in a transversely movable rail 30 as indicated by the arrow B in FIG. 2. The rail 30 extends in parallelism with the beams 14 and 15 and is carried by a run each of two endless chains 33 and 34. The chain 33 is mounted on the traverse member 12 and convoluted about two rollers 35 and 36 thereof; the chain 34 is similarly trained about a roller 37 of traverse member 13 as well as two further rollers 38 and 39 in the frame 10 and a drive roller 40 of a motor 41. A shaft 42 connects the rollers 35 and 37 of the chains 33 and 34, respectively, so that the drive provided by the roller 40 of the motor 41 is imparted not only to the chain 34 but also transmitted to the chain 33 whereby the two move in parallel motion.

A substantially U-shaped beam 45 is mounted at the underside of the carriage 29, turnable about an upright axis as indicated particularly clearly in FIG. 3. A pneumatic cylinder and piston unit 47 is provided which is connected at one end pivotably on an arm 48 projecting from the carriage 29. The piston rod 46 of the piston of the unit 47 is connected with the beam 45 whereby, as a result of operation of the unit 47, the beam 45 is turnable through 90° about the upright axis between a transverse position and a longitudinal position, and vice versa.

As is most clearly shown in FIG. 3, the beam 45 has two downwardly extending arms 50 and 51 at whose free edges flaps or panels 52 and 53 are respectively mounted for tuning movement or pivoting movement in such a manner that they can either pivot upwardly towards one another to thereby close the downward directed open side of the U-shaped cross-section of the beam 45, or can pivot downwardly away from one another to open this side. This movement is clearly evident in FIG. 3.

An arm 54 projects from the panel 52 and a similar arm 55 projects from the panel 53; these arms 54 and 55 are each connected with a piston rod of a cylinder and piston unit 56 and 57, respectively, which in turn are connected to the arms 50 and 51 of the beam 45. Located in the interior of the latter are two side walls 58 and 59 which can be displaced with reference to one another and which, together with a pair of abutment walls 60 and 61 which are respectively connected to the side walls 58 and 59 for displacement, define with the panels 52 and 53 a collecting chamber 62 which has one open side capable of being moved into registry with the supply means supplying the objects—here bag-packages—200 to be deposited in the receptacles 100.

A cylinder and piston unit 65 is also provided on the carriage 29, having a piston rod 66 which projects downwardly through the hollow turning axis for the beam 45 and which in the illustrated embodiment carries at its lower free end a suction device 67 of any suitable construction. Such suction devices are well known. An arm 70 projects from the carriage 26 towards the frame 10 and is provided with a fork 71 turnable about an upright axis and in which a frame 72 and a roller 73 of a conveyor belt 74 are turnably journalled. The other end of the frame 72 and a second roller 75 for the belt 74 are journalled in a second fork 76 which is mounted on a support 77 for turning movement at 76'. The support 77 in turn is longitudinally displaceable along guide rods 78 on an arm 79 projecting from the frame 10.

A motor 80 continuously drives the conveyor belt 74 via a belt drive 81, a stub shaft 82, a set of bevel gears 83 and the roller 75. The chamber 62, together with the outlet 74' of the conveyor belt 74 constitutes a distributor head for the packages or objects 200.

In the operation of the exemplary illustrated device the conveyor 11 advances upwardly open receptacles or containers 100 until they are located at the loading station below and between the traverse members 12 and 13. The packages 200 which are to be deposited in these receptacles 11 fall onto the right-hand end of the conveyor belt 74 (see FIG. 2) from a suitable supplier, such as a machine which forms these packages. The belt 74 is continuously driven in such a manner that the objects 200 are supplied seriatim and with longitudinal spacing to the chamber 62 into which they are flung with a slight heave through that open side of the chamber 62 which faces outlet end 74' of the belt 74. They fall onto the panels 52 and 53 and slide along these against the walls 60 and 61 in the direction normal to the plane of FIG. 3. When the panels 52 and 53 pivot downwardly away from one another, the containers or objects 200 in the chamber 2 fall downwardly into the receptacle 100 located below the chamber 62.

If the objects 200 are to be deposited in a receptacle 100 in the simplest pattern, in which the objects 200 overlie one another flat in stack form, the two carriages 16 and 29 are moved into a position in which they are located above the upper open side of the respective receptacle 100 and in which the abutment walls 60 and 61 are located above the left side wall of the receptacle 100. The panels 52 and 53 are moved alternately from horizontal to vertical position so that the objects 200 fall serially in flat condition into the receptacle 100.

If the objects 200 are to be deposited in a receptacle 100 in such a manner that several—for instance four—stacks are located adjacent one another in a single row, then the chamber 62 is so positioned that it assumes the necessary four discharge positions one after the other. For this purpose the first carriage 16 is shifted by the width of one object 200 whenever a previous one has just been deposited. This takes place until it has reached all four positions. In the respective end positions, that is in the first and fourth positions, the carriage 16 remains for double the time period, because two articles 200 are deposited at each of these positions before the carriage 16 moves on. The necessary movement is imparted via the motor 24 and the chain drive 20.

If it is desired to deposit the objects 200 in several stacks and in several rows of stacks, then it is not only the carriage 16 but also the carriage 29 which is displaced, via the motor 41. Firstly, the carriage 16 is moved as before to deposit a row of the objects 200 adjacent one another. Thereupon the carriage 29 is shifted transversely to the direction of advancement of the carriage 16 and now the latter is again shifted in direction opposite to its previous direction to deposit a second row next to the originally deposited first row. This continues until the container or receptacle 100 is filled with the desired number of rows and the desired number of layers of objects in each row.

It will be appreciated that with the arrangement according to the present invention it is also possible to deposit the objects 200 according to a pattern in which the objects of a first row are positioned, say, longitudinally and the objects of an adjacent second row are positioned, say, transversely. In the different layers which are created within the respective receptacle 100 these rows are then offset with reference to one another, that is a row of longitudinally arranged articles is deposited on top of a row of transversely arranged articles, and vice versa, in order to increase the coherence of the layers deposited in the receptacle 100. For this purpose a row of objects 200 is first deposited in longitudinal parallelism with one another in accordance with the second example described above. Subsequently the carriage 29 is moved in a position in which the carriage 16 can advance to deposit the second row. Turning the objects 200 transversely to the direction of the objects 200 in the first row is achieved in that whenever an object has entered the chamber 62, the carrier 45 or beam 45 is turned about its vertical turning axis through 90°. In other words, initially the beam 45 will be in a position in which the open side of the chamber 62 faces the discharge end 74' of the conveyor belt 74. Having received one of the objects 200 in this position, the beam 45 is then turned through 90° and the panels 52 and 53 are downwardly opened. Subsequently, the beam or carrier 45 is returned to its initial position and the panels 52 and 53 return to their closed horizontal position. The chamber 62 is now ready to receive another object 200 and at the same time the carriage 16 is advanced by the length of one of the objects 200 to deposit the next one. When a layer of objects have been deposited in the receptacle 100 in this manner, this layer and the following layers are deposited in the same manner except that the positions of the carriage 29 in which the carrier 45 is always turned through 90° for depositing the respective objects 200, are offset by half the length and half the width of the objects 200 as compared to the positions which the carriage 29 assumed for the previous layer.

In some circumstances it may be necessary or desirable not to let the objects 200 fall freely out of the chamber 62 into the receptacle 100. In this case they are engaged by the suction device 67 before the panels 52 and 53 move downwardly to open position, and subsequently the cylinder and piston unit 65 is operated to advance the piston rod 66 with the suction device 67 downwardly whereupon the suction device 67 is de-activated and releases the respective object 200 in position in the receptacle 100. The piston rod 66 is then immediately withdrawn to its upper position illustrated in FIG. 3.

Naturally, the suction device 67 can be replaced by a pressure plate, for instance, carried in the same manner as the suction device and serving to press down upon the objects deposited in the respective receptacles 100, should this be desired.

If several objects, for instance two or three, are to be deposited in the respective receptacle 100 in a stack, then a counter 90 of known construction provides a signal which actuates the panels 52 and 53 for movement to open position. The counter 90 counts the objects moving on the belt 74 and after having counted a pre-set number it originates a signal to the cylinders 56, 57 which operate the panels 52 and 53 and move them from closed to open position. Thus, they are moved to open position only after a desired number of articles 200 has moved into the chamber 62.

Quite frequently, articles or objects such as bag-shaped packages or the like have a wedge-shaped configuration. In order to deposit thusly shaped articles in a stack in such a manner that a thin end of one article overlies the thick end of the article which is either below or above it, the device 85 is operated. It comprises two deflecting elements 91 and 92 which are alternately displaceable transversely of the belt 74 into the path of advancing articles 200. It should be pointed out that in this case the articles or objects 200 will advance on the belt 74 with their elongation extending transversely to the belt 74, rather than longitudinally of the belt 74. As FIG. 2 shows that end of each of the elements 91 and 92—which are respectively carried by push rods 93—facing upstream towards the oncoming objects 200, is slightly deflected or deformed as illustrated in FIG. 2. As the objects advance on the belt 74, they will abut against the deflected end of that one of the elements 91 or 92 which has been pushed into its path transversely of the belt 74. In FIG. 2 this happens to be the element 91, and it will be appreciated that when this contact takes place, the respective object 200 is deflected ultimately through 90°, either to one side or the other—in dependence upon whether the element 91 or 92 has been transversely advanced—and then is longitudinally aligned with the movement of the belt 74 to move into the guide device 86 whose lateral guide walls are transversely adjustable for differently-dimensioned objects or articles 200, and from where it advances towards the discharge end 74' of the belt 74. The rods 93 are carried by arms 74 which in turn are connected to rods 95 transversely displaceable in the frame 72 of the belt 74. The rods 95 are displaceable according to a preselectable program by an operating cylinder 96 whose piston rod 97 is connected intermediate the rods 93 on a traverse 98. According to the program alternate ones of the objects 200 will be turned through 90° to alternate sides, so that for instance the first object 200 advances lengthwise of the belt 74 with its thin end—it being kept in mind that in the discussion at the moment wedge-shaped objects are involved—pointing in forward direction, whereas the next object 200 is so displaced that its thick end points in forward direction. The actual deposition of these objects via the chamber 62 then takes place as discussed before.

If several objects 200 are to be deposited at one time adjacent one another, then the guide element 88 is so displaced by its associated cylinder and piston unit 87 that the oncoming objects 20 move into the chamber 62 laterally adjacent one another. When the panels 52 and 53 subsequently are downwardly displaced to open position, the laterally adjacent objects 200 then fall in that same position into the receptacle 100.

It will be appreciated, of course, that the various approaches for obtaining different deposition patterns can be combined as desired in order to create other patterns in addition to those described.

When one of the receptacles 100 is filled it is replaced by an empty one, and in order to avoid further supply of articles or objects 200 during the time required to substitute a new empty receptacle for a full one, the supplying machine—for instance a packaging machine—can be temporarily stopped or the packages supplied by the machine can be routed into a storage receptacle during this time period.

The various functions discussed above in the illustrated exemplary embodiment can be controlled in various ways known to those skilled in the art. For instance a highly advantageous manner of obtaining such control is via a program device such as a programmable matrix or a patchboard assembly of the type disclosed for instance in U.S. Pat. Nos. 3,184,700 or 3,267,407. The theredisclosed devices can be adapted without any difficulty by persons skilled in the art to the purposes of the present invention. Of course, punch card controls or other control devices can also be employed and are similarly well known to those skilled in the art. The purpose of these control devices is to control the various functions of the apparatus or arrangement according to the present invention, that is to operate the various motors, cylinder and piston units, and the like.

It is clear that a wide variety of objects can be handled with an arrangement according to the present invention. Thus, hard packages or soft packages such as bags of flour, sugar, paste wax, to name just a few, can be deposited in this manner. This is true also of bottles, cartons or the like.

It will be understood that each of the elements described above, or two or more together, may also find a useful application in other types of constructions differing from the types described above.

While the invention has been illustrated and described as embodied in an arrangement for depositing objects in a receptacle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for depositing objects in a receptacle, comprising first means for positioning at a loading station a receptacle having an upwardly directed opening; second means for conveying objects seriatim to said loading station; and third means at said loading station receiving said objects and being movable in a plane above and at least substantially parallel with said opening in two mutually inclined directions, said third means being operable for depositing said objects through said opening in said receptacle and comprising a support structure, wall means turnably mounted on said support structure and defining a chamber having a lateral side open towards and communicating with said second means for receiving said objects from the same through said lateral side, and a lower side open to said opening and provided with a bottom wall movable between a first position overlying said lower side and a second position withdrawn from said open side and exposing the same to said opening.

2. An arrangement as defined in claim 1, wherein said third means is movable in two mutually normal directions.

3. An arrangement as defined in claim 1; and further comprising drive means for moving said third means in said mutually inclined directions.

4. An arrangement as defined in claim 1, said bottom wall comprising at least two pivotable panels mounted for movement between said first and second positions.

5. An arrangement for depositing objects in a receptacle, comprising first means for positioning at a loading station a receptacle having an upwardly directed opening; second mean for conveying objects seriatim to said loading station; and third means at said loading station receiving said objects and being movable in a plane above and at least substantially parallel with said opening in two mutually inclined directions, said third means being operable for depositing said objects through said opening in said receptacle and comprising support means at said loading station, a first carriage on said support means and displaceable thereon relative to said opening in a first one of said directions, a second carriage on said first carriage and displaceable with reference thereto and to said opening in the second one of said directions, and a distributor on said second carriage and adapted to receive said objects from said second means and to deposit them in said receptacle at locations determined by the position of said distributor relative to said opening.

6. An arrangement as defined in claim 5; and further comprising a first and a second chain drive respectively associated with said first and said second carriage for displacing the same in said first and second directions, respectively.

7. An arrangement as defined in claim 1, said third means further comprising a suction device for engaging said objects and depositing them in said receptacle.

8. An arrangement as defined in claim 7; and further comprising displacing means for displacing said suction device between an upper position in which it receives objects from said second means, and a lower position in which it lowers said objects through said opening and deposits them in said receptacle.

* * * * *